US012561890B2

(12) United States Patent
Reyes Lozano

(10) Patent No.: US 12,561,890 B2
(45) Date of Patent: Feb. 24, 2026

(54) TECHNIQUE FOR GENERATING A BOUNDING VOLUME HIERARCHY

(71) Applicant: Advanced Micro Devices, Inc., Santa Clara, CA (US)

(72) Inventor: Leo Hendrik Reyes Lozano, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 211 days.

(21) Appl. No.: 18/477,363

(22) Filed: Sep. 28, 2023

(65) Prior Publication Data

US 2025/0111585 A1 Apr. 3, 2025

(51) Int. Cl.
*G06T 15/06* (2011.01)
*G06T 15/08* (2011.01)

(52) U.S. Cl.
CPC .............. *G06T 15/06* (2013.01); *G06T 15/08* (2013.01); *G06T 2210/12* (2013.01); *G06T 2210/21* (2013.01)

(58) Field of Classification Search
CPC ..... G06T 15/06; G06T 15/08; G06T 2210/12; G06T 2210/21
USPC .......................................................... 345/424
See application file for complete search history.

(56) References Cited

U.S. PATENT DOCUMENTS

2008/0192044 A1* 8/2008 Fowler .................... G06T 15/06
345/419
2008/0259075 A1* 10/2008 Fowler .................... G06T 15/06
345/421

2011/0248997 A1* 10/2011 Munkberg .............. G06T 17/20
345/426
2011/0283086 A1* 11/2011 Mejdrich ........... G06F 15/7825
712/30
2011/0316855 A1* 12/2011 Mejdrich ................ G06T 15/06
345/420
2012/0050289 A1* 3/2012 Park ...................... G06T 17/005
345/426
2013/0033507 A1* 2/2013 Garanzha .............. G06T 17/005
345/522
2014/0362074 A1* 12/2014 Karras .................... G06T 15/06
345/419
2018/0082466 A1* 3/2018 Akenine-Moller ... G06T 15/005
2021/0287429 A1* 9/2021 Vaidyanathan ....... G06T 15/005
2021/0383591 A1* 12/2021 Gupta ...................... G06T 15/08
2021/0407171 A1* 12/2021 Clark ...................... G06T 15/06
2022/0189096 A1* 6/2022 Wu ........................ G06T 15/005
2023/0118972 A1* 4/2023 Wald ...................... G06T 17/10
707/778

(Continued)

OTHER PUBLICATIONS

"Bounding Volume Hierarchies", The University of Utah CS6965: Parallel Hardware Ray Tracing class, Fall 2011, downloaded from: https://my.eng.utah.edu/~cs6965/slides/06.pdf on Sep. 28, 2023, 55 pgs, 2011.

*Primary Examiner* — David T Welch

(74) *Attorney, Agent, or Firm* — Volpe Koenig

(57) ABSTRACT

A technique for building a bounding volume hierarchy is disclosed. The technique includes for a subject node, selecting a dimension along which to perform a split to form child nodes of the subject node; assigning primitives of the subject node to the child nodes; and updating bounds for the child nodes in a next split dimension and not in the other dimensions.

20 Claims, 8 Drawing Sheets

(56)                    References Cited

U.S. PATENT DOCUMENTS

| | | | | |
|---|---|---|---|---|
| 2023/0252725 | A1* | 8/2023 | Mcallister | G06T 17/005 |
| | | | | 345/419 |
| 2023/0252726 | A1* | 8/2023 | Mcallister | G06T 15/06 |
| | | | | 345/419 |
| 2023/0334777 | A1* | 10/2023 | Davison | G06T 17/005 |
| 2023/0410377 | A1* | 12/2023 | Zhang | H04N 19/91 |
| 2024/0095996 | A1* | 3/2024 | Muthler | G06T 15/06 |
| 2025/0191275 | A1* | 6/2025 | Burns | G06T 15/06 |

* cited by examiner

100

402

404

Scene Geometry 503 → BVH Builder 501 → BVH 505

600

Select a dimension along which to perform a split for a subject node

602

Assign primitives of the subject node to child nodes

604

Update bounds for child nodes

606

Select Split Dimension

Longest

Width 1

Node 1 702(1)
Bounds: Width 1, Height 1
Triangles: All

Height 1

All Triangles 704(1)

Update Bounds for Child Nodes

Select Split Dimension

Assign Triangles to Sides

Assign Triangles to Nodes

Update Bounds for Child Nodes

TECHNIQUE FOR GENERATING A BOUNDING VOLUME HIERARCHY

BACKGROUND

In image synthesis, ray tracing is utilized to find a nearest intersection of a given ray with a scene where light propagation is simulated.

BRIEF DESCRIPTION OF THE DRAWINGS

A more detailed understanding can be had from the following description, given by way of example in conjunction with the accompanying drawings wherein.

DETAILED DESCRIPTION

A technique for building a bounding volume hierarchy is disclosed. The technique includes for a subject node, selecting a dimension along which to perform a split to form child nodes of the subject node; assigning primitives of the subject node to the child nodes; and updating bounds for the child nodes in a next split dimension and in a dimension along which the split occurs, and not in the dimension that is neither the next split dimension nor the dimension along which the split occurs.

Figure 1:
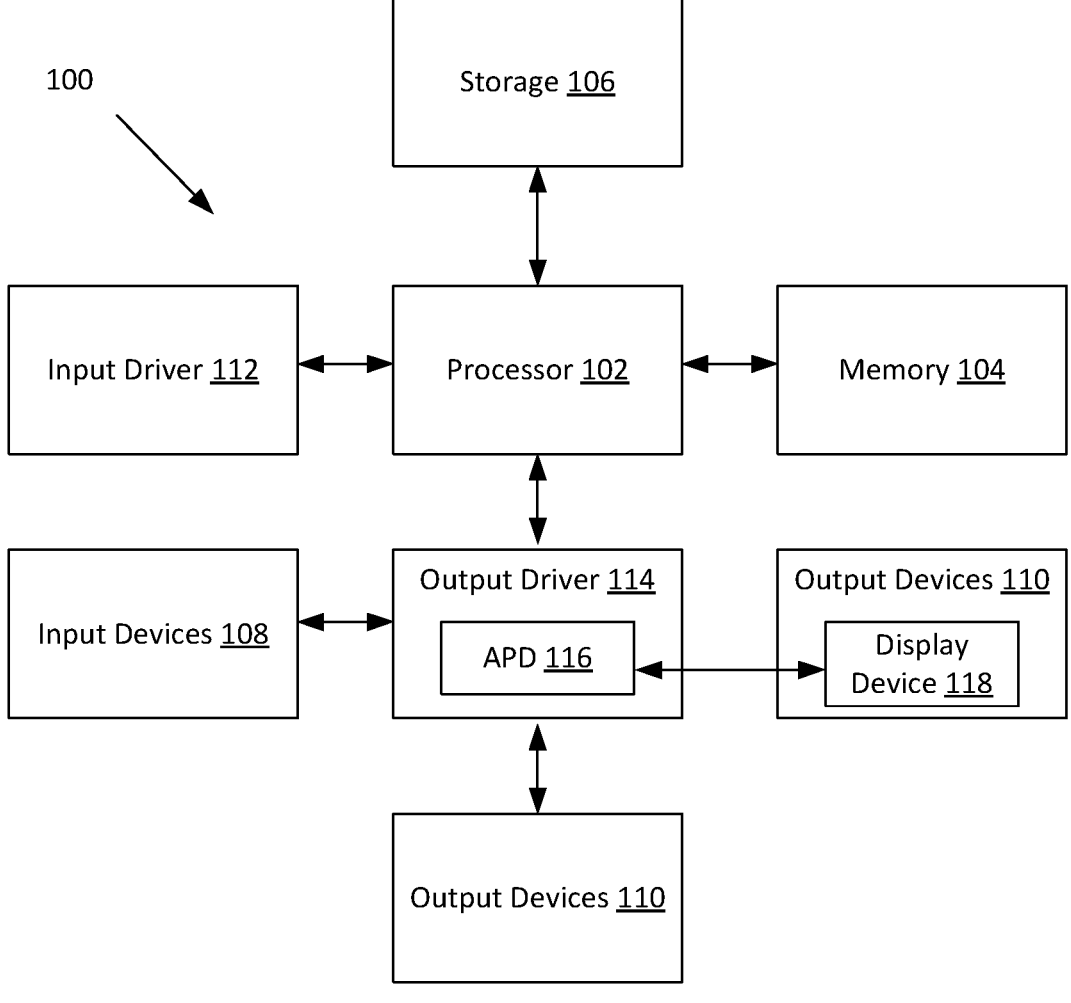
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
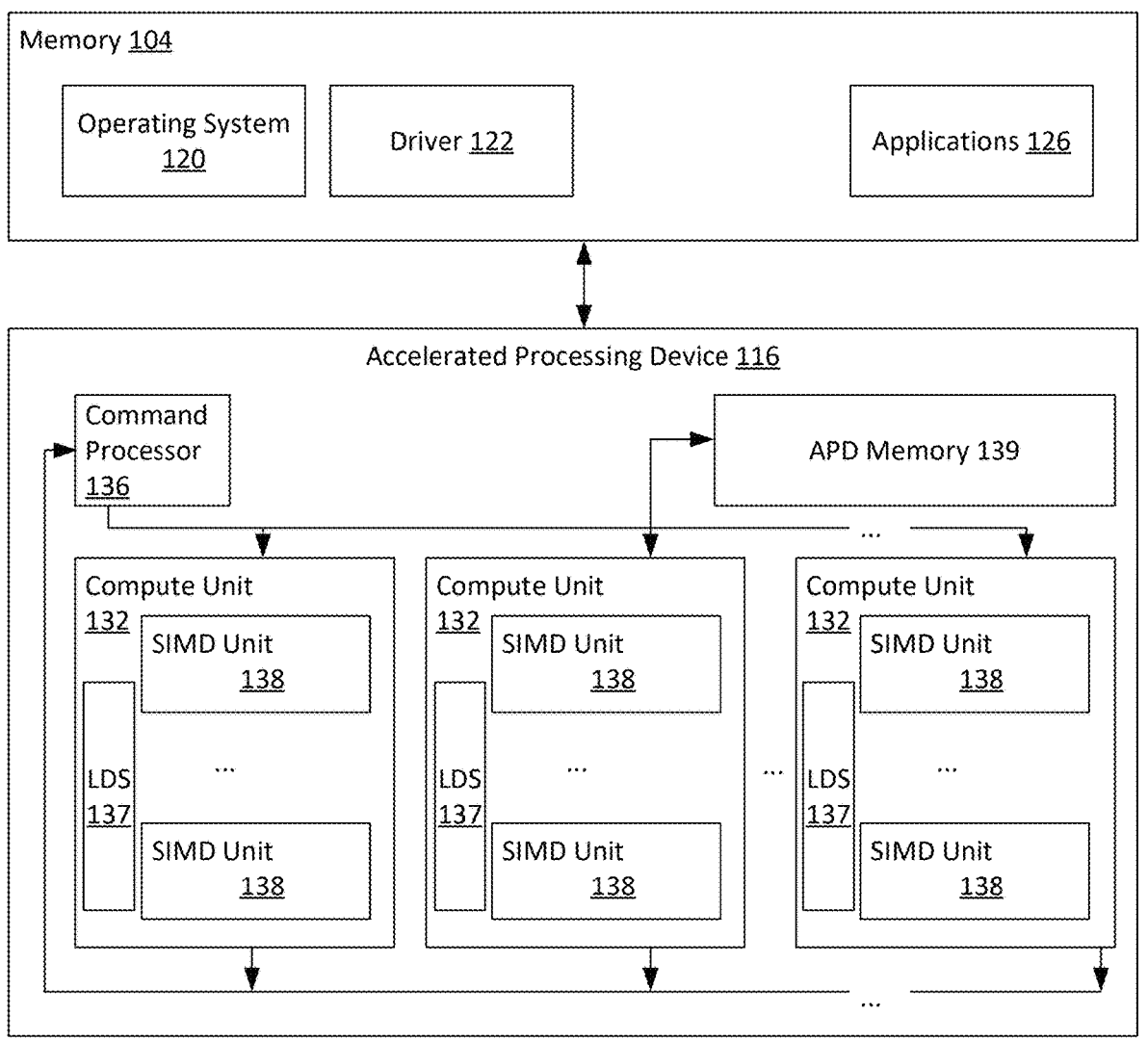
FIG. 2 is a block diagram of the device of FIG. 1, illustrating additional detail, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. The driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The compute units 132 are sometimes referred to as "parallel processing units 202" herein. Each compute unit 132 includes a local data share ("LDS") 137 that is accessible to wavefronts executing in the compute unit 132 but not to wavefronts executing in other compute units 132. A global memory 139 stores data that is accessible to wavefronts executing on all compute units 132. In some examples, the local data share 137 has faster access characteristics than the global memory 139 (e.g., lower latency and/or higher bandwidth). Although shown in the APD 116, the global memory 139 can be partially or fully located in other elements, such as in system memory 104 or in another memory not shown or described. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline (e.g., custom operations performed to supplement processing performed for operation of the graphics pipeline). An application 126 or other software executing on the processor 102 transmits programs that define such computation tasks to the APD 116 for execution.

The APD 116 is configured to implement features of the present disclosure by executing a plurality of functions as described in more detail below. For example, the APD 116 is configured to receive images comprising one or more three dimensional (3D) objects, divide images into a plurality of tiles, execute a visibility pass for primitives of an image, divide the image into tiles, execute coarse level tiling for the tiles of the image, divide the tiles into fine tiles and execute fine level tiling of the image. Optionally, the front end geometry processing of a primitive determined to be in a first one of the tiles can be executed concurrently with the visibility pass.

Figure 3:
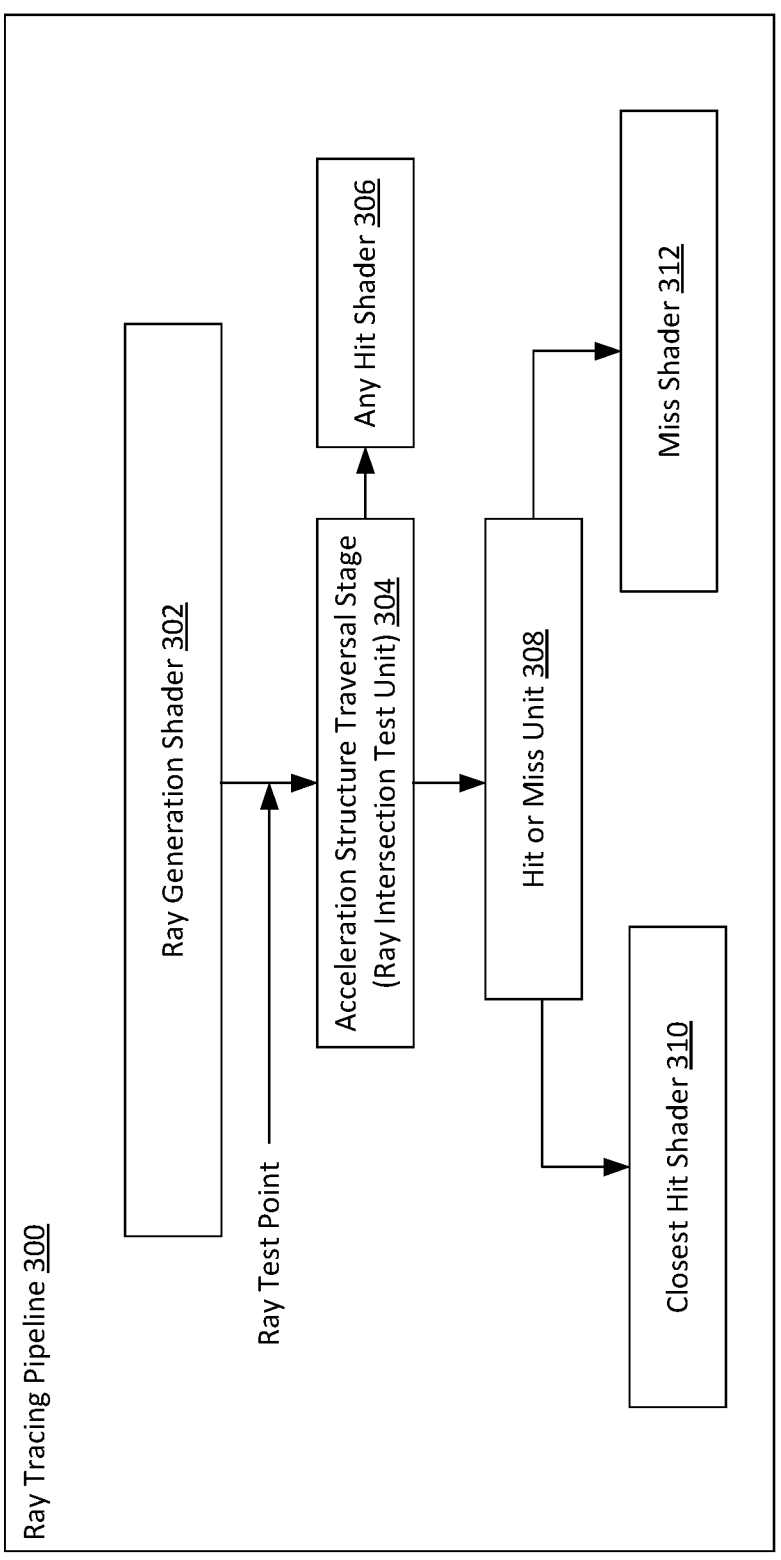
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is precompiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel. As described elsewhere herein, it is possible for individual rays to generate multiple samples, which each sample indicating whether the ray hits a triangle or does not hit a triangle. In an example, a ray is cast with four samples. Two such samples hit a triangle and two do not. The triangle color thus contributes only partially (for example, 50%) to the final color of the pixel, with the other portion of the color being determined based on the triangles hit by the other samples, or, if no triangles are hit, then by a miss shader. In some examples, rendering a scene involves casting at least one ray for each of a plurality of pixels of an image to obtain colors for each pixel. In some examples, multiple rays are cast for each pixel to obtain multiple colors per pixel for a multi-sample render target. In some such examples, at some later time, the multi-sample render target is compressed through color blending to obtain a single-sample image for display or further processing. While it is possible to obtain multiple samples per pixel by casting multiple rays per pixel, techniques are provided herein for obtaining multiple samples per ray so that multiple samples are obtained per pixel by casting only one ray. It is possible to perform such a task multiple times to obtain additional samples per pixel. More specifically, it is possible to cast multiple rays per pixel and to obtain multiple samples per ray such that the total number of samples obtained per pixel is the number of samples per ray multiplied by the number of rays per pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed. It should be understood that where a first node points to a second node, the first node is considered to be the parent of the second node.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
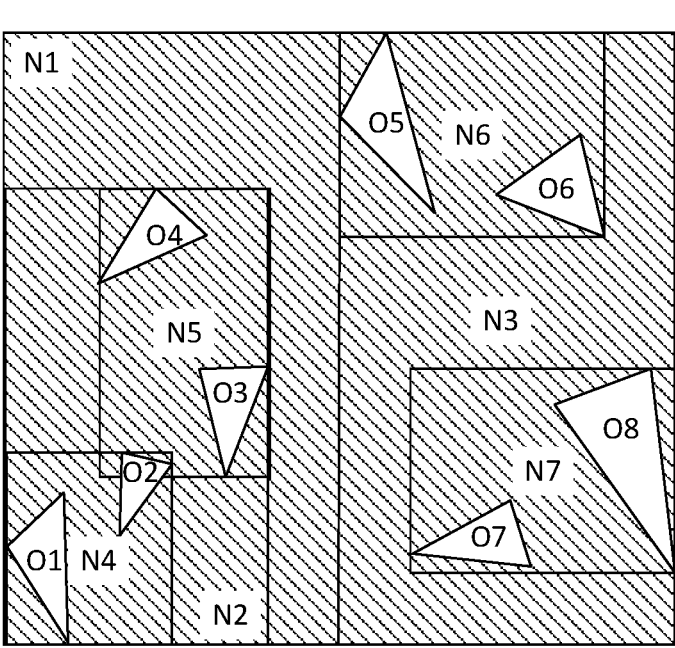
FIG. 4 is an illustration of a bounding volume hierarchy ("BVH"), according to an example.
Figure 4:
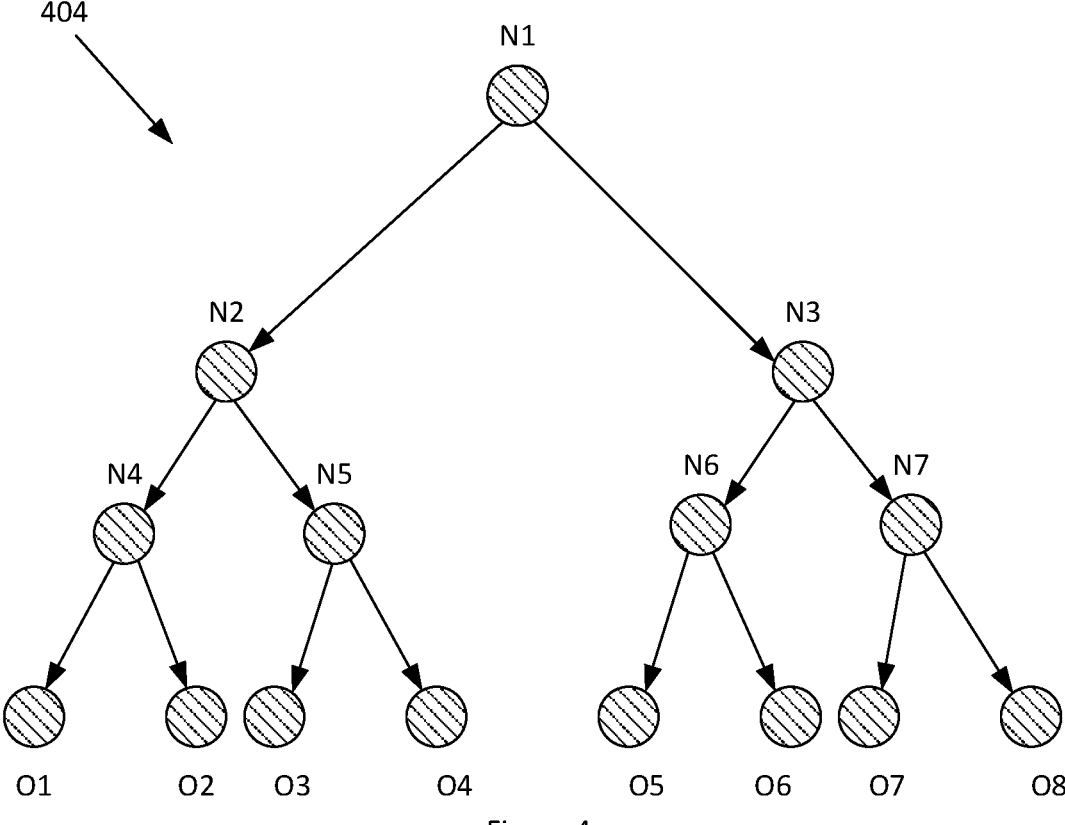

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed.

FIGS. 1-4 above describe an implementation in which a top-down build for a bounding volume hierarchy may be performed. The top-down build for a bounding volume hierarchy generates a bounding volume hierarchy for a scene, accepting the geometry of the scene (e.g., a collection of triangles) as input and generating a BVH as output. In general, the top-down build involves iteratively generating nodes for the BVH. In each node, candidate splits of triangles in the node are determined and children for the node are determined based on an evaluation of the candidate splits. Additional detail is now provided.

Figure 5:
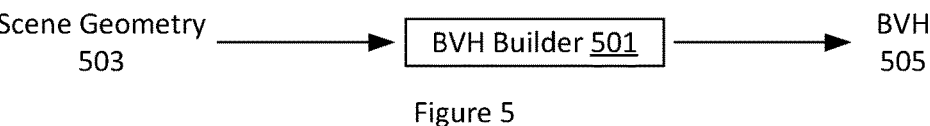
FIG. 5 illustrates generating of a BVH, by a BVH builder, from scene geometry, according to an example.

FIG. 5 illustrates generating a BVH 505, by a BVH builder 501, from scene geometry, according to an example. A BVH builder 501 accepts scene geometry 503 and generates a bounding volume hierarchy 505 using a top-down technique. The scene geometry 503 includes geometric objects that correspond to the objects of a scene to be rendered. The BVH 505 is a bounding volume hierarchy that allows for quickly determining whether a ray intersects scene geometry of a scene, as described with respect to FIGS. 1-4. In various examples, the BVH builder 501 is embodied completely in software, completely in hardware (e.g., as circuitry), or as a combination thereof. In different examples, the BVH builder 501 is within the device 100 in which ray tracing is performed or is within a different system. In an example, an application developer creates a scene having geometry and uses a BVH builder 501 to generate a BVH corresponding to that scene, then ships the application to a user for execution. In another example, the application developer uses the BVH builder 501 to generate the BVH corresponding to a scene and also executes the application with ray tracing enabled, using the BVH. In another example, a BVH builder 501 present in the device 100 (e.g., within the APD 116) generates a BVH from scene geometry for an application and then the APD 116 uses the generated BVH to render the geometry of the scene. Although some example usage scenarios are described, these examples should not be taken as limiting.

In some approaches, building a BVH requires a number of different steps or phases. Such steps include calculation of Morton codes for primitives, sorting of the primitives based on Morton codes, building a two-wide BVH (in which each node can have a maximum of two children), and converting the two-wide BVH into a BVH format that can have more than two children per node, which is typically more performant. In some such approaches, each such phase requires a separate kernel dispatch (e.g., a separate invocation of a shader program), and each such dispatch incurs some overhead. In addition to the above, the reliance on explicit Morton codes results in a limited precision, as Morton codes are integer values. Thus, when evaluating primitives in a relatively small geometric area, it can be difficult to accurately craft the BVH based on primitive position.

For these reasons, a different technique is provided herein. This technique is based on implicit Morton codes and does not suffer from many of the drawbacks above. Additional details follow.

According to a technique, the BVH builder 501 builds a BVH in a top-down manner. Specifically, the BVH builder 501 begins with a root node and a list of primitives of a scene or model for which to build a BVH. Then, the BVH builder 501 generates children of that node and assigns the primitives of the root node to the child nodes. The BVH builder 501 continues in this manner until a termination condition (such as all bottom-level nodes having at most a certain number of primitives) is met.

In the present disclosure, the BVH builder 501 builds a BVH in a top-down manner in a sequence of phases. A phase is a set of operations for a particular node (the "subject node") of the BVH under construction. In any particular phase, the BVH builder 501 generates child nodes for the subject node of the phase.

Figure 6:
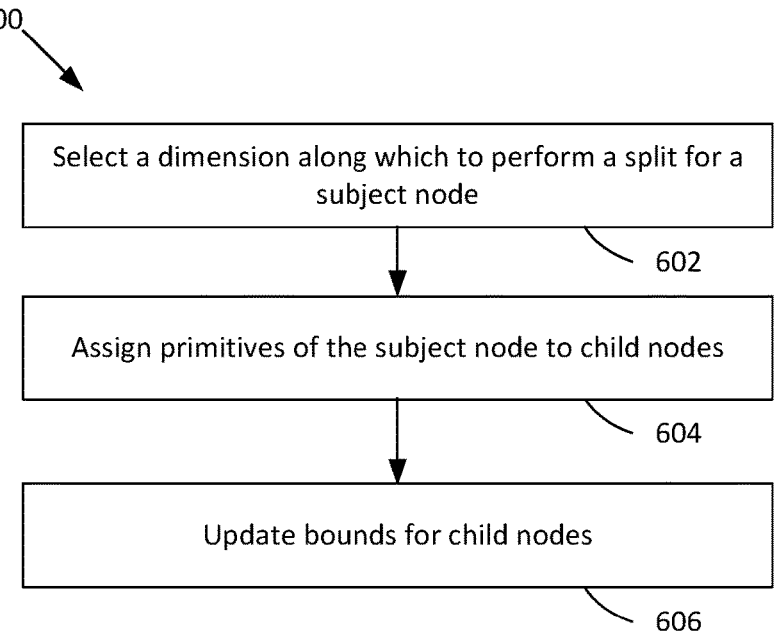
FIG. 6 is a flow diagram of a method 600 that illustrates operations that the BVH builder performs in each such phase, according to an example.

FIG. 6 is a flow diagram of a method 600 that illustrates operations that the BVH builder 501 performs in each such phase, according to an example. Although described with respect to the system of FIGS. 1-5, those of skill in the art will recognize that any system, configured to perform the steps of the method 600 in any technically feasible order, falls within the scope of the present disclosure.

The operations of the method 600 represent operations performed in any given phase (i.e., operations for creating child nodes for a parent node). At step 602, phase, the BVH builder 501 selects a dimension along which to perform a split, assigns primitives of the subject node to child nodes 604, and updates the bounding volume for the child nodes 606.

While building the BVH, each node of the BVH is associated with a bounding box. In some examples, for the root node, the bounding box is the volume that tightly bounds all primitives of the root node. In some examples, tightly bounding the primitives means that the bounding box is sized just large enough to encompass all of the centroids of the primitives of the root node. In some examples, a centroid is a center point of an object. In some examples, at least some of the primitives are triangles and the centroid of a triangle is the point at which the three medians of the triangle intersect. In some examples, the median is a line that joins a point of a triangle to the middle point of the opposite side of the triangle.

At step 602, regarding selecting a dimension along which to perform a split, the BVH builder 501 performs this selection according to a dimension selection criterion. In some examples, the dimension selection criterion is the largest dimension of the bounding box for the node. In an example, the node has a bounding volume with extents in three dimensions (e.g., x, y, z, or length, width, height). The selection criterion includes selecting the dimension that is the largest. For example, if the bounding box had a size in the z dimension that is 10 units, and in the x and y dimensions that are 5 units, then the selection criterion would select dimension z as the dimension along which to divide the bounding volume.

At step 604, the BVH builder 501 assigns primitives of the parent node to the child nodes according to a split. Specifically, the BVH builder 501 determines which side of the split each primitive falls on (specifically, which side the centroid of the primitive falls on) and assigns each primitive to a side of the parent node based on this determination.

Then, the BVH builder 501 determines whether to create new non-leaf nodes or to create new leaf nodes based on the number of primitives in each side. If the number of primitives in a side is less than that specified by a termination criterion, then the BVH builder 501 generates a new leaf node for that side and assigns the primitives for that side to that new leaf node. If the number of primitives in a side is greater than that specified by the termination criterion, then the BVH builder 501 generates a new non-leaf node for that side and assigns the primitives of that side to that new non-leaf node. In an example, a first primitive has a centroid that falls on one side of a split associated with a first child node and thus the BVH builder 501 assigns that first primitive to the first side. Continuing the example, a second primitive has a centroid that falls on another side of the split and thus the BVH builder 501 assigns that second primitive to the second side. After all primitives of the node have been assigned to a side, the BVH builder 501 determines which types of nodes to generate based on the number of nodes in each side.

In general, it can be seen that step 604 involves placing primitives on a side of a split in the dimension selected in step 602. The position of the split in the selected dimension can be determined in any technically feasible manner. In one example, the BVH builder 501 determines that the split is the midpoint, in the selected dimension, of the bounds of the parent bounding volume. In other words, in this example, the bounding volume of the subject node is split in half along the selected dimension.

At step 606, the BVH builder 501 sets the bounding volume for each of the child nodes of the subject node. In some examples, the BVH builder 501 sets the bounding volume for each child as equal to the bounding volume of the parent, except in the dimension along which the split occurs ("the split dimension") as well as in a "next split dimension," if that is different than the split dimension. In the split dimension, the BVH builder 501 sets that dimension for each child based on the location of the split. More specifically, as stated above, there is a split point in a particular dimension. The BVH builder 501 sets the bounds in that dimension for any particular child as having an extent that is co-located with the split point. In an example in which a box is split in two in a dimension, one child has the minimum extent of the parent box in that dimension as the minimum extent of the child and the split point as the maximum extent of the child. Continuing this example, the other child has the maximum extent of the parent box in that dimension as the maximum extent and the split point as the minimum extent. For splits of more than two, the split point and minimum/maximum in the split dimension are used for the extents of the child nodes as appropriate.

The BVH builder 501 also sets the "next split dimension." More specifically, for each child node that is a non-leaf node, the BVH builder 501 determines the dimension for which the split will occur in the next split. Then, for that dimension, the BVH builder 501 adjusts that dimension to tightly fit the primitives of the node corresponding to the split. For example, if the next split dimension for a child node is the x axis, then the BVH builder 501 sets the minimum and maximum extents of the bounding volume in the x dimension for such child node to be a value that tightly fits all primitives of that child node in the x dimension. It should be understood that the separate descriptions of steps 604 and 606 should not be considered as limiting with regards to the times in which the operations of such steps occur. In some examples, steps 604 and 606 occur together and/or at the same time.

The BVH builder 501 repeats the above, generating children for the various nodes by splitting the associated bounding boxes and assigning primitives to the nodes, until a termination condition is met. In an example, the termination condition is that there are no more non-leaf nodes left to split, as all bottom-level nodes are leaf nodes.

The split described above can be thought of as equivalent to assigning each primitive of a node to children of that node by calculating one or more most significant bits of a Morton code. More specifically, a Morton code is an integer value that interleaves low precision discretized coordinates of any given point. The most significant bit(s) of the Morton code thus indicates a very coarse position for a particular dimension or set of dimensions for a coordinate. Thus, splitting based on the largest dimension as described above can be thought of as splitting based on the most significant bit(s) of a Morton code.

Although it is stated above that the bounding box of the root node tightly bounds all triangles of that node, it is not necessarily true that the bounding box of any other node tightly bounds the geometry of that node. This aspect is part of the trade-off of the techniques of the present disclosure. Specifically, the top-down BVH build operation splits the primitives of a node and updates only one dimension of the bounding volume for the child nodes. The other dimensions are not modified even though bounding volumes for a subset of nodes for any given split can be smaller in any particular dimension than the bounding volume for the parent node. This represents a trade-off between accuracy and performance. In some examples, a subsequent "refit" operation occurs that does tightly fit the bounding volumes of the non-leaf nodes to the underlying geometry, but these operations are not done in a way that hinders the other operations for building the BVH, so they do not affect performance. Specifically, it is possible to parallelize the operations of the BVH builder 501 (e.g., within an APD 116), but certain actions require atomic instructions to be performed. Specifically, updating the bounding volumes requires atomic instructions to update each dimension of the bounding volume. These operations must be done atomically because the updates to the dimensions for the situation in which the bounding volumes are tightly fit to the primitives requires this update to be done cohesively. If such updates are done by multiple threads, then without atomics, it could be possible for the threads to perform such updates in a way that is nonsensical. If all dimensions were updated, then this would require more atomic instructions than only updating a small number of dimensions.

It is also possible to perform this technique without updating the bounding volume according to the primitive centroids. For example, it is possible to update the bounding volumes only considering the bounding volume geometry and not the primitive centroids. In an example, to split a dimension in two, the BVH builder 501 simply divides the length in that dimension by two and does not shrink this bounding volume further based on the positions of the centroids. This is a quick operation that could be done without atomic operations, but would result in reduced performance, as some splits would have zero triangles, which would require additional splits to be performed.

In various examples, the units that would perform the technique in parallel include one or more of the compute units 132, threads on the processor 102, or other entities.

Figure 7A:
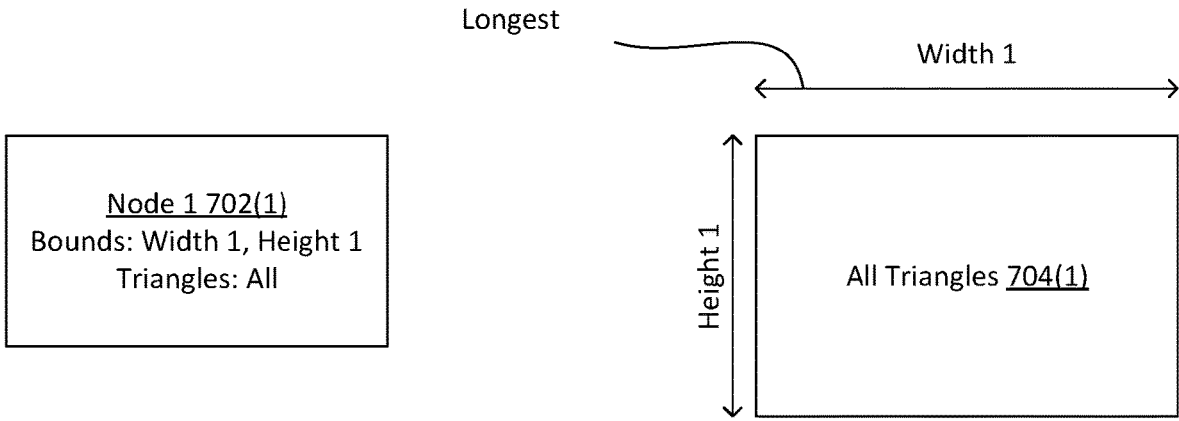
FIGS. 7A-7H illustrate an example sequence of operations for building a BVH.

FIGS. 7A-7F illustrate an example sequence of operations for building a BVH. It should be noted that although the geometry in these Figures is illustrated as two-dimensional, this is for explanatory purposes and that the principles shown and described can be extended to three dimensions. FIG. 7A begins with a root node 702(1). The root node has bounds (bounding volume) of width 1 and height 1. (Herein, for the terms "width X" and "height X," the X values are simply identifiers and do not represent lengths. Thus, "width 1" means "the first width discussed," "height 1" means "the first height discussed," and so on. In particular, it should be noted that in the example shown, width 1 is larger than height 1.). The root node 702(1) has a first set of triangles 704(1), marked as "all triangles." This means that the root node 702(1) is associated with all primitives for which the BVH is being built.

FIG. 7A illustrates an example of step 602, in which the BVH builder 501 selects a dimension along which to perform a split according to a criterion. In the example shown, the criterion is the dimension that is larger. In the example shown, this dimension is the width dimension and thus the BVH builder 501 selects the width dimension as the dimension along which to perform the split. Any other criterion for selecting a dimension could be used. Another example is the surface area heuristic, such as the point where the sum of the surface area is the smallest for each side.

Figure 7B:
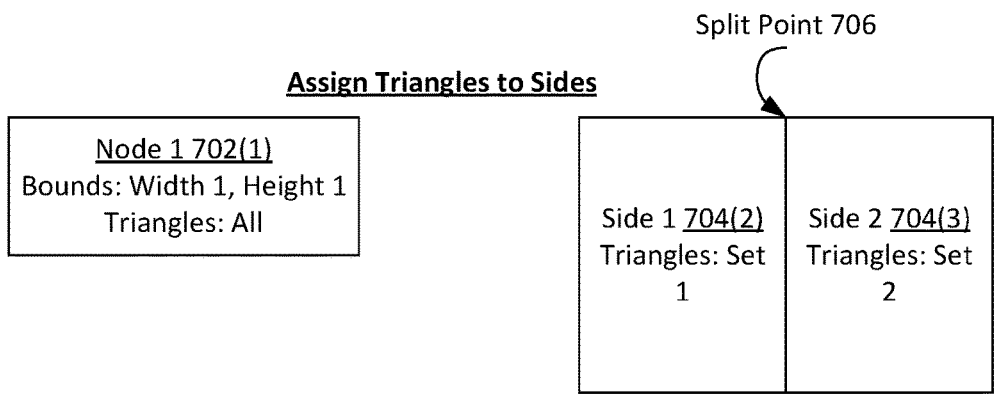
Figure 7C:
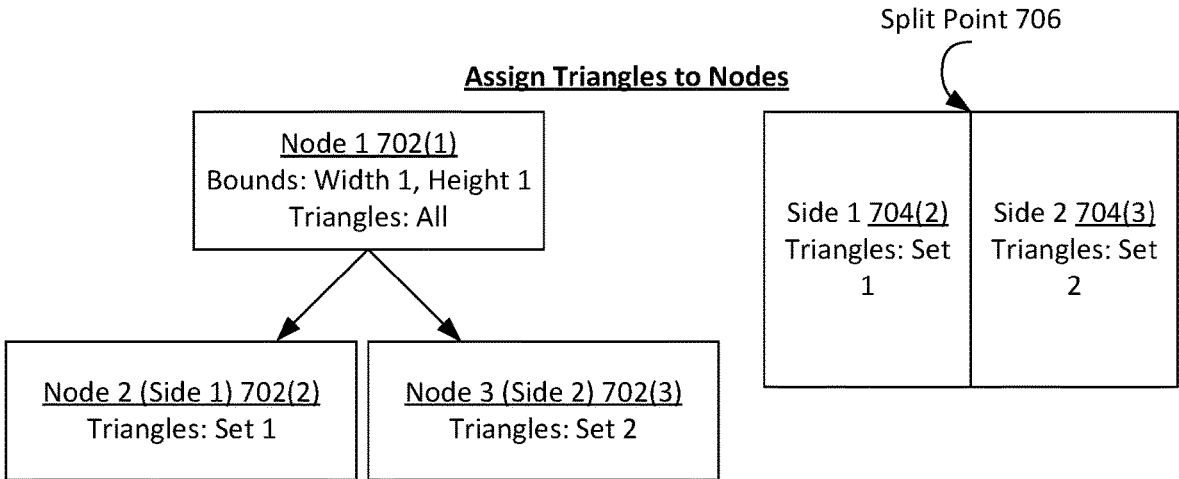

FIGS. 7B and 7C illustrates an example of step 604. Specifically, the BVH builder assigns the triangles of the node 702(1) to a particular side 704 based on a comparison of the centroids of the triangles to the split point 706. As can be seen, triangles that fall on one side of the split point 706 are assigned to side 1 704(2) and triangles that fall on another side of the split point 706 are assigned to side 2 704(3).

In FIG. 7C, the BVH builder 501 checks the number of triangles in each side 704 and determines whether to generate a leaf node or a non-leaf node for each side. In some examples, if the number is greater than a threshold, then the BVH builder 501 generates a non-leaf node and if the number is not greater than a threshold, then the BVH builder 501 generates a leaf node. In the example of FIG. 7C, both sides have a number of triangles greater than a threshold and thus the BVH builder 501 assigns the triangles from each side 704 to a respective non-leaf node 702.

In some implementations, the children bounding boxes are updated during step 604.

Figure 7D:
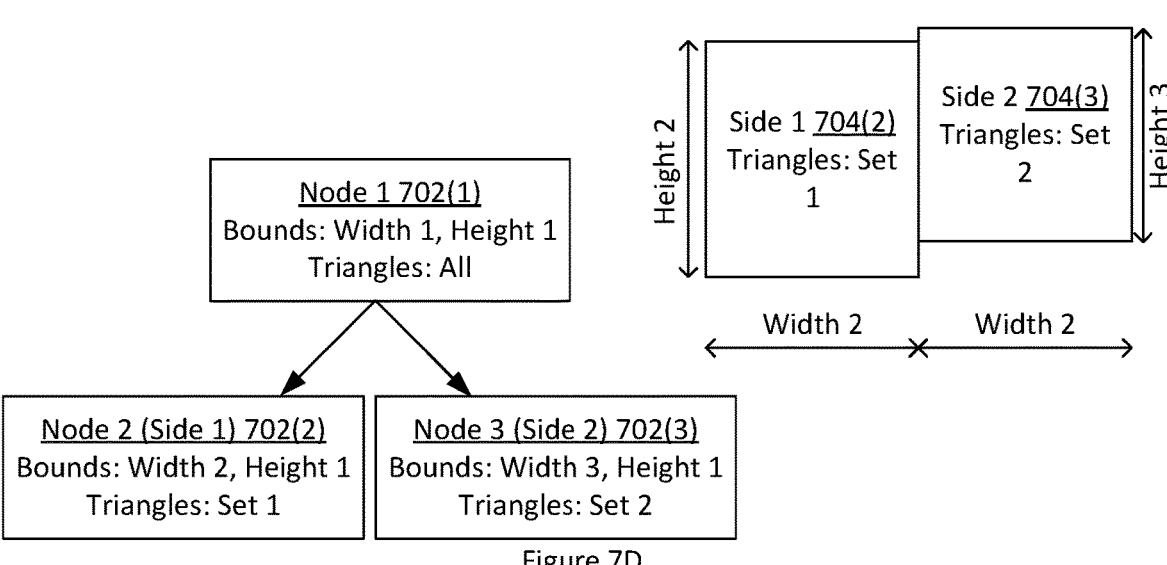

FIG. 7D illustrates an example of step 606. Specifically, the BVH builder 501 updates the bounds for each child of 702(1) in the dimension of the next split. In the example shown, the dimension of the next split is the height, since this is the larger dimension. Thus, the BVH builder 501 updates the bounds for the child nodes in the height dimension. Updating the dimension for a given node 702 includes determining the minimum and maximum coordinate for the centroids of all triangles assigned to that node 702, in the dimension being updated, and updating the dimension of the bounding volume for that node as spanning the minimum and maximum coordinate. As can be seen, node 2 702(2) has width 2 and height 2 and node 3 702(3) has width 2 and height 3.

Figure 7E:
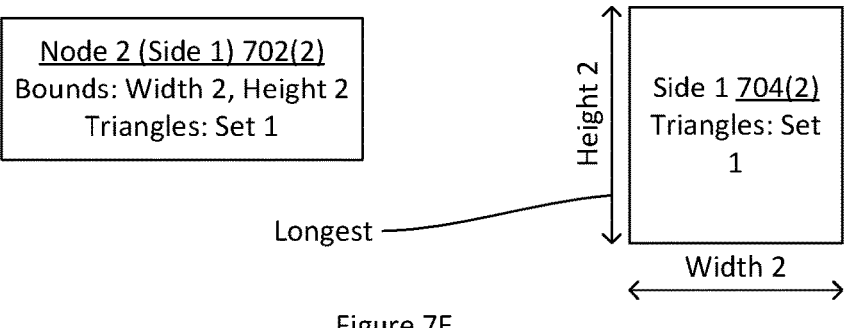

FIG. 7E illustrates an example of step 602, for generating children for node 2 702(2). In this operation, the BVH builder 501 selects the height dimension as the dimension to split, as this is the longest dimension.

Figure 7F:
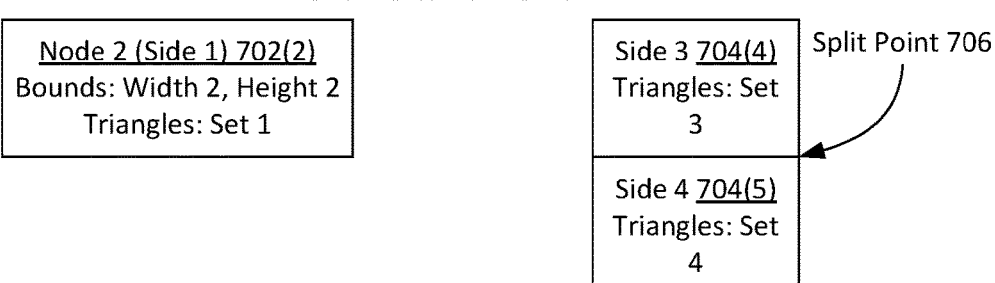

FIG. 7F illustrates an example of a portion of step 604, including assigning triangles to sides 704, each of which is at a particular side of the split point 706. The BVH builder 501 assigns triangles to a side 704 by determining which side of the split point 706 the centroid of that triangle falls on. In the example illustrated, some triangles of node 2 702(2) fall on side 3 704(4) and some triangles fall on side 4 704(5).

Figure 7G:
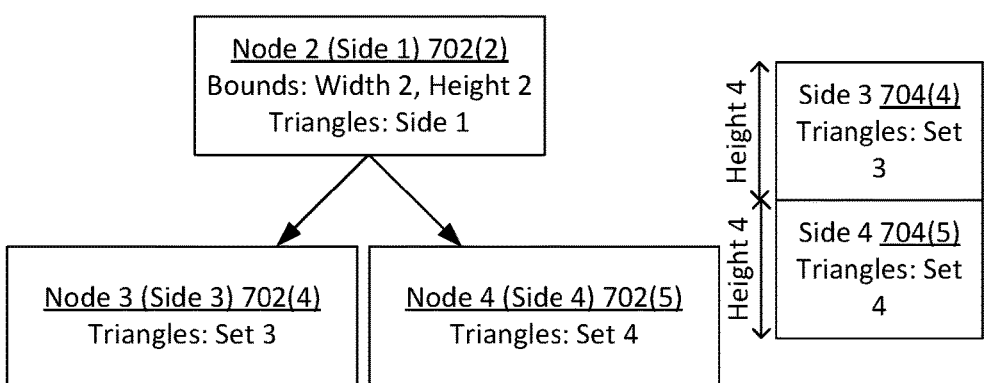

FIG. 7G illustrates an example of the next portion of step 604, including assigning triangles to nodes. As described elsewhere herein, the BVH builder 501 assigns triangles to nodes based on the number of triangles in each side. In the illustrated example, the number of triangles on each of side 3 704(4) is above a threshold and thus the BVH builder 501 generates non-leaf nodes. In the example illustrated, these nodes are node 3 702(4) and node 4 702(5).

Figure 7H:
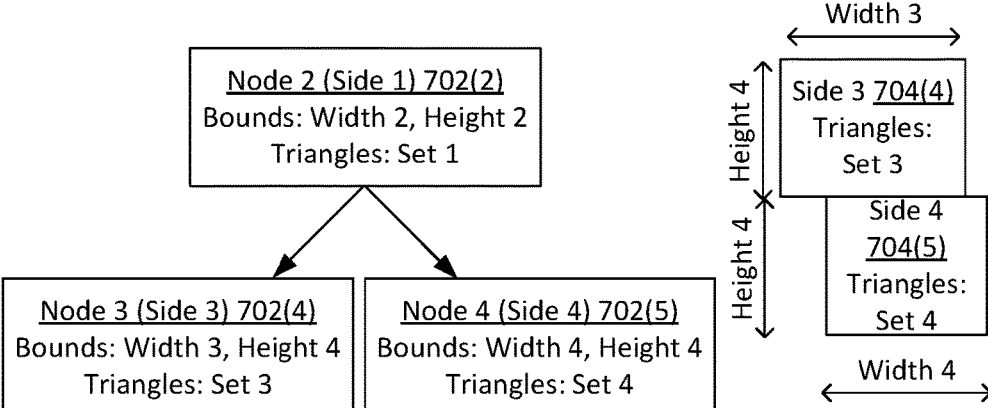

FIG. 7H illustrates an example of step 606. In this operation, the BVH builder 501 updates the bounding volumes for nodes 3 and 4 based on the extents of the triangles. It can be seen that the BVH builder 501 shrinks the bounding volumes for nodes 3 and 4 in the width dimension to tightly fit the triangles in that dimension. The BVH builder 501 selects that dimension as the dimension in which to shrink the nodes, since that dimension is the predicted dimension of next split (as that dimension is the longest).

The description above provides a technique for generating a BVH-2—a BVH in which nodes can have up to two children. In some examples, the technique is modified to generate a higher width BVH, such as a BVH-4 (where nodes can have up to four children) or a BVH-8. In this example, in each "phase," the BVH builder 501 processes a subject node by identifying more than two splits for the bounding volume of the subject node. In one example, the BVH builder 501 selects a single dimension for all such splits (for example, splitting the height three times), assigns triangles based on the splits, and adjusts the length of the split dimension for each node. In another example, the BVH builder 501 hierarchically splits the bounding volume for a subject node. Performing such hierarchical split means performing a first split along a first dimension selected according to a criterion (e.g., longest) to generate resultant volumes, and then performing a second split along a second dimension (which can be the same or different than the first dimension) selected according to a criterion. The result of such splits are multiple subdivisions of the bounding volume. In the dimension update step (step 606), the BVH builder 501 sets the bounds of the subdivisions as if each split of the hierarchical split were its own separate split for a BVH-2. In other words, in some implementations, the BVH builder 501 updates along the first split dimension in a similar manner as with the update for a single split in a BVH-2 split, and then in the second dimension in a similar manner as within the update for a single split in a BVH-2 split, and so on.

It should be understood that the term "triangles" is sometimes used interchangeably herein with the term "primitives." It should be understood that although the term "triangles" is sometimes used, the term can be replaced with any other geometry type for which a BVH is being built, and that the term "primitives" covers all such geometry.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of building a bounding volume hierarchy, the method comprising:

for a subject node of the bounding volume hierarchy, selecting a dimension along which to perform a split at a split point to form child nodes of the subject node; assigning primitives of the subject node to the child nodes based on the split;

identifying a next split dimension;

setting bounds for the child nodes in the split dimension as the bounds of the subject node in the split dimension, split by the split point; and updating bounds for the child nodes in the next split dimension and not in the split dimension or other dimensions, wherein updating the bounds in the next split dimension includes setting the bounds to fit centroids of all primitives of the child nodes in the next split dimension.

2. The method of claim 1, wherein the next split dimension is the dimension along which the split occurs in a next split and updating the bounds updates the bounds for the dimension along which the split occurs in the next split and not in the two other dimensions.

3. The method of claim 1, wherein updating the bounds for a child node includes shrinking the bounds to tightly fit triangles assigned to the child node.

4. The method of claim 1, further comprising performing a split hierarchically to form more than two child nodes.

5. The method of claim 1, wherein selecting the dimension includes selecting a longest dimension or selecting the dimension according to a surface area heuristic.

6. The method of claim 1, wherein assigning the primitives includes assigning primitives to a first child node of the child nodes, where the primitives fall on a side of a split assigned to the first child node, and assigning primitives to a second child node of the child nodes.

7. The method of claim 1, further comprising repeating the selecting, assigning, and updating to build a bounding volume hierarchy until a termination condition is met.

8. The method of claim 7, wherein the termination condition is that each leaf node has at most a threshold number of primitives.

9. The method of claim 1, further comprising performing ray tracing operations utilizing the bounding volume hierarchy.

10. A system for building a bounding volume hierarchy, the system comprising:

a memory configured to store the bounding volume hierarchy; and a processor configured to:

for a subject node of the bounding volume hierarchy, select a dimension along which to perform a split at a split point to form child nodes of the subject node;

assign primitives of the subject node to the child nodes based on the split;

identifying a next split dimension;

set bounds for the child nodes in the split dimension as the bounds of the subject node in the split dimension, split by the split point; and update bounds for the child nodes in the next split dimension and not in the split dimension or other dimensions, wherein updating the bounds in the next split dimension includes setting the bounds to fit centroids of all primitives of the child nodes in the next split dimension.

11. The system of claim 10, wherein the next split dimension is the dimension along which the split occurs in a next split and updating the bounds updates the bounds for the dimension along which the split occurs in the next split and not in the two other dimensions.

12. The system of claim 10, wherein updating the bounds for a child node includes shrinking the bounds to tightly fit triangles assigned to the child node.

13. The system of claim 10, further comprising performing a split hierarchically to form more than two child nodes.

14. The system of claim 10, wherein selecting the dimension includes selecting a longest dimension or selecting the dimension according to a surface area heuristic.

15. The system of claim 10, wherein assigning the primitives includes assigning primitives to a first child node of the child nodes, where the primitives fall on a side of a split assigned to the first child node and assigning primitives to a second child node of the child nodes.

16. The system of claim 10, wherein the processor is further configured to repeat the selecting, assigning, and updating to build a bounding volume hierarchy until a termination condition is met.

17. The system of claim 16, wherein the termination condition is that each leaf node has at most a threshold number of primitives.

18. The system of claim 10, wherein the processor is further configured to perform ray tracing operations utilizing the bounding volume hierarchy.

19. A non-transitory computer-readable medium storing instructions that, when executed by a processor, cause the processor to perform operations comprising:

for a subject node of a bounding volume hierarchy, selecting a dimension along which to perform a split at a split point to form child nodes of the subject node;

assigning primitives of the subject node to the child nodes based on the split;

identifying a next split dimension;

setting bounds for the child nodes in the split dimension as the bounds of the subject node in the split dimension, split by the split point; and updating bounds for the child nodes in the next split dimension and not in the split dimension or other dimensions, wherein updating the bounds in the next split dimension includes setting the bounds to fit centroids of all primitives of the child nodes in the next split dimension.

20. The non-transitory computer-readable medium of claim 19, wherein the next split dimension is the dimension along which the split occurs in a next split and updating the bounds updates the bounds for the dimension along which the split occurs in the next split and not in the two other dimensions.

\* \* \* \* \*